United States Patent [19]

Tangonan

[11] 4,262,995
[45] Apr. 21, 1981

[54] PLANAR STAR COUPLER DEVICE FOR FIBER OPTICS

[75] Inventor: Gregory L. Tangonan, Oxnard, Calif.

[73] Assignee: Hughes Aircraft Company, Culver City, Calif.

[21] Appl. No.: 17,625

[22] Filed: Mar. 5, 1979

[51] Int. Cl.³ .............................................. G02B 5/14
[52] U.S. Cl. ............................. 350/96.16; 350/96.12
[58] Field of Search ............... 350/96.15, 96.16, 96.17, 350/96.12, 96.13, 96.14

[56] References Cited

U.S. PATENT DOCUMENTS

| | | | |
|---|---|---|---|
| 4,023,887 | 5/1977 | Speers | 350/96.15 |
| 4,087,159 | 5/1978 | Ulrich | 350/96.15 |
| 4,139,259 | 2/1979 | Kersten et al. | 350/96.16 |
| 4,143,941 | 3/1979 | Soref | 350/96.16 |
| 4,165,225 | 8/1979 | Auracher et al. | 350/96.15 |
| 4,175,827 | 11/1979 | McMahon | 350/96.14 |
| 4,181,400 | 1/1980 | Malsot et al. | 350/96.21 |

OTHER PUBLICATIONS

Altman article "Fiber Optics Appls. in the Shipboard Data Multiplex System", NEEC/TR1995, Aug. 1976, pp. 31-33.
Auracher "Planar Branching Network for Multinode Glass Fibers", *Optics Communications*, vol. 17, No. 1, Apr. 1976.
Porter article "An Experimental Fiber Optic Data Bus System and Design Considerations" for Boeing Commercial Airplane Company, Seattle, Wash., Feb. 1978, We-5.1.

*Primary Examiner*—Stewart J. Levy
*Attorney, Agent, or Firm*—Mary E. Lachman; W. H. MacAllister

[57] ABSTRACT

The specification describes a new and improved optical coupler which comprises (1) a substrate which is adapted to receive and reflect light, having formed therein and adjacent the major (or top) surface of the substrate an optical waveguiding structure comprising three interconnected light confining and propagating sections and (2) a light-reflecting or light-transmitting means. The first section of the waveguiding structure comprises a plurality of spaced-apart optical channel waveguides, each of which extends to a first minor surface of the substrate [which is perpendicular to the major (or top) surface of the substrate]. The second section of the waveguiding structure comprises a plurality of horn-shaped, tapered wave transition sections or regions which extend integrally from the channel waveguides and which are adjacently joined to each other at common points to form a multiple side-by-side horn-like configuration. The third section of the waveguiding structure comprises a wave-mixing section which is integral at one end thereof with the tapered wave transition sections or regions and which extends at the other end thereof to a second minor surface (or transmissive plane) of the substrate. In addition, at the second minor surface or transmissive plane of the substrate there may be provided a means for transmitting or reflecting light which is propagated thereto by the wave-mixing section. The tapered geometry of the wave transition sections enhances the optical coupling efficiency between the plurality of channel waveguides and the wave-mixing section.

15 Claims, 6 Drawing Figures

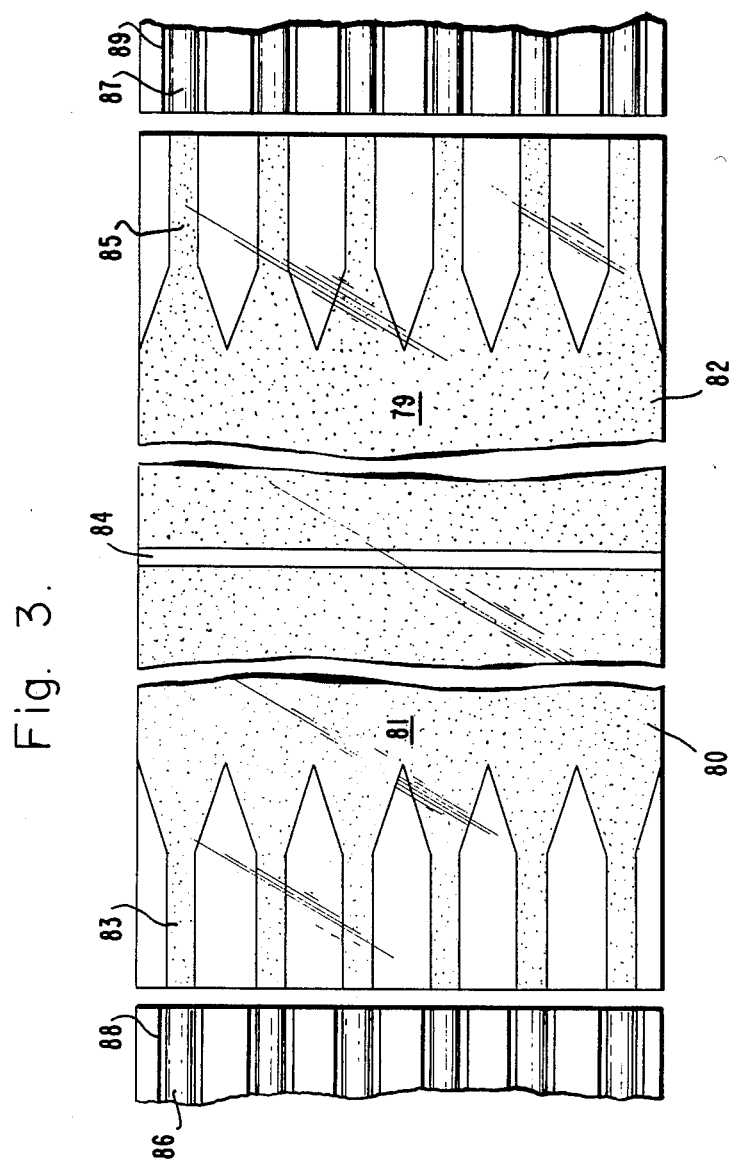

PLANAR STAR COUPLER DEVICE FOR FIBER OPTICS

FIELD OF THE INVENTION

This invention relates generally to planar multimode coupler devices for optical fibers, and more particularly to planar star coupler devices for optical fibers, i.e., a device which mixes the optical inputs from various terminals and then distributes the mixed optical fields to various terminals.

BACKGROUND OF THE INVENTION

In optical communication systems, messages are transmitted by carrier waves of optical frequencies that are generated by sources such as lasers or light-emitting diodes. There is much curent interest in such optical communication systems because they offer several advantages over certain other conventional communication systems, such as a greatly increased number of channels of communication and the ability to use other materials besides expensive copper cables for transmitting messages. One such means for conducting or guiding waves of optical frequencies from one point to another is called an "optical waveguide." The operation of an optical waveguide is based on the fact that when a medium which is transparent to light is surrounded or otherwise bounded by another medium having a lower refractive index, light introduced along the inner medium's axis is highly reflected at the boundary with the surrounding medium, thus producing a light guiding effect.

In a multimode fiber optic system, in which multiple electric field profiles shape the light fields, couplers are necessary, for example, to achieve parallel distribution of data by means of optical fibers from a single source, such as a computer, to multiple end points, such as terminals, or from multiple end points to a single source. Current approaches to optical coupler formation include processes which use microoptic components such as microlenses and splitters or processes which manipulate the optical fibers, such as by fusing, tapering, lapping, or gluing. The former approach has the disadvantage that lenses must be cut and polished to specification, which are costly processes. In the latter approach of manipulating the optical fibers, there is the disadvantage of difficulty in contolling the extent of contact of the fibers and the exact geometry and reproducibility of the final structure.

Another approach to the problem of coupling optical signals between certain locations or points is to use a star coupler device consisting of a cylindrical glass rod having within it and accessible at each end, two bundles of glass fibers which terminate within the glass rod at a point such that the two separate bundles do not contact each other. An optical input to any one fiber of one bundle of fibers is propagated through the glass rod and transmitted as an output by all fibers in the second bundle of fibers. However, the major disadvantage of this approach is that there are packing fractior losses which are caused by propagated light striking the clad of the fiber rather than the core of the fiber. Since light is guided only by the core of the fiber, any light which falls on the surrounding clad of the fiber is lost and ineffective.

Another star coupler device known in the art uses a thin (approximately 65 micrometers) glass slide with a linear array of optical fibers abutted to each end of the slide. This star coupler device functions in a manner similar to that described above with respect to the rod device and has the same significant disadvantage of packing fraction losses. For example, if 8 fibers having a core with a diameter which is one-half the total fiber diameter are used in a linear array, by placing them side by side in a ribbon shape, the theoretical packing fraction loss is 42 percent, that is, the expected optical output is reduced by 42%.

In a related area of merely coupling two optical signals together, a Y-shaped optical coupling device has been used and is fabricated by conventional planar processing. Such a device is disclosed in copending application Ser. No. 25,709, filed Apr. 2, 1979, assigned to the present assignee. Other horn structures are known in the art and have been used in single mode optical waveguides to expand the electric field profie of an optical signal. However, these single mode optical waveguides do not perform the data distribution function discussed above with respect to star couplers.

SUMMARY OF THE INVENTION

The general purpose of this invention is to provide a new and improved planar star coupler device for optical fibers which possesses most, if not all, of the advantages of the prior art multimode optical coupling devices while alleviating their significant disadvantages discussed above.

In order to accomplish the above-described general purpose of the invention, I have discovered and developed a new and improved optical coupler which comprises (1) a substrate which is adapted to receive and reflect light, having formed therein and adjacent the major (or top) surface of the substrate an optical waveguiding structure comprising three interconnected light confining and propagating sections and (2) a light-reflecting or light-transmitting means. The first section of the waveguiding structure comprises a plurality of spaced-apart optical channel waveguides, each of which extends to a first minor surface of the substrate (which is perpendicular to the major or top surface of the substrate). The second section of the waveguiding structure comprises a plurality of horn-shaped, tapered wave transition sections or regions which extend integrally from the channel waveguides and which are adjacently joined to each other at common points to form a multiple side-by-side horn-like configuration. The third section of the waveguiding structure comprises a wave-mixing section which is integral at one end thereof with the tapered wave transition sections or regions and which extends at the other end thereof to a second minor surface (or transmissive plane) of the substrate. In addition, at the second minor surface or transmissive plane of the substrate there may be provided a means for transmitting or reflecting light which is propagated thereto by the wave-mixing section. The tapered geometry of the wave transition sections enhances the optical coupling efficiency between the plurality of channel waveguides and the wave-mixing section.

In various embodiments of the present invention, the second minor surface or transmissive plane of the substrate is provided with (1) a means that is totally reflective or (2) a means that is totally transmissive, or (3) a means that is partially transmissive and partially reflective.

Accordingly, it is an object of the present invention to provide a new and improved optical coupler in which the angular expansion and collection of internally reflected light is controlled in order to provide more efficient transfer of light from the input of the device to the output and thereby avoiding packing fraction losses.

Another object is to provide a device of the type described which is useful for the parallel distribution of optical data.

Still another object is to provide a device of the type described in which light from an input port at one end thereof is propogated through the device and transmitted out through ports at the opposite end of the device.

Yet another object is to provide a device of the type described in which light from the input port is propogated through the device, reflected from a surface at the opposite end of the device from the input port, and transmitted out through ports at the same end of the device as the input port.

A further object is to provide a device of the type described in which light from the input port is propagated to the midpoint of the device and (1) partially transmitted through the midpoint and transmitted out through ports at the opposite end of the device from the input port, and (2) partially reflected at the midpoint of the device and transmitted out through ports at the same end of the device as the input port.

Another object of the present invention is to provide a device of the type described in which the amount of light reaching various output ports can be graded so that some ports have larger outputs than other ports.

Still another object of the present invention is to provide a device of the type described which is formed by planar methods which are highly reproducible and versatile, can be batch processed, and have a relatively high yield and a relatively low cost.

A further object of the present invention is to provide a device of the type described in combination with one or separate pluralities of optical fibers and a means for achieving straightforward alignment of the device with these external optical fibers.

Yet another object of the present invention is to provide a unique and novel optical coupling geometry between channel waveguide and mixer portions of the coupler which tends to maximize optical coupling efficiency.

DRAWINGS

FIG. 1b is a cross-section view taken along lines B—B of FIG. 1a.

FIG. 3 is a plan view of another planar optical coupler embodiment of the invention, including a plurality of input data transmission optical fibers and a plurality of output data transmission optical fibers. This figure illustrates the partially transmissive and partially reflective mode of optical coupling according to the invention.

DESCRIPTION OF THE PREFERRED EMBODIMENTS

Figure 1A:
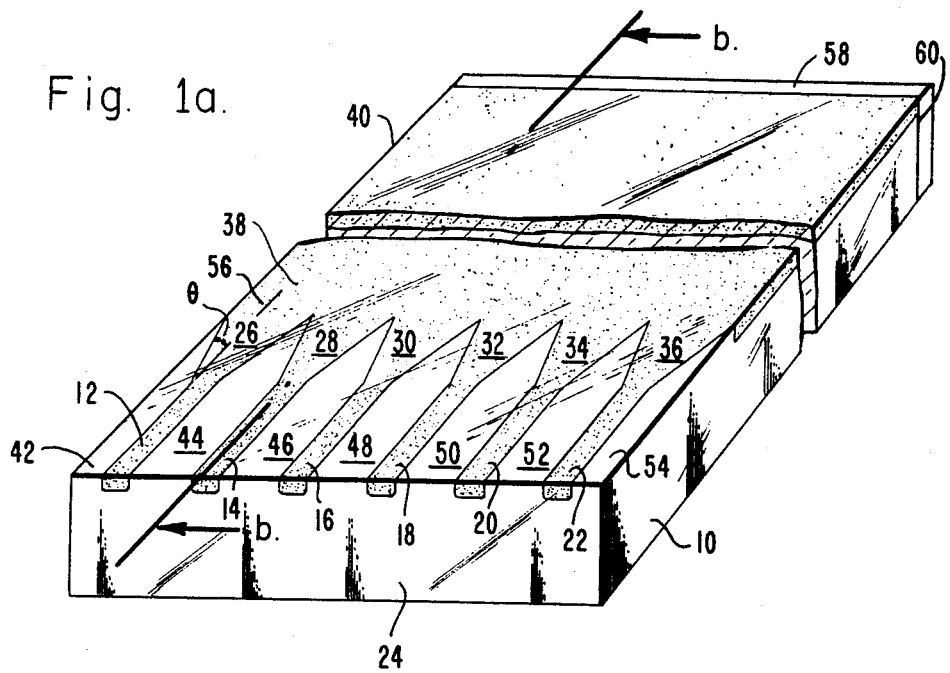
FIG. 1a is an enlarged isometric view of the planar optical coupler forming one embodiment of this invention.

Referring now to FIG. 1, there is shown a reflective mode planar optical coupler according to the invention and includes a soda glass slide or substrate 10 having typical dimensions of two millimeters in thickness, two centimeters in width and twelve centimeters in length. The substrate or slide 10 is commercially available and may be obtained, for example, from the Corning Glass Works, of Corning, New York.

The glass substrate 10 is masked and then treated using one of the processes to be described (but which form no part of this invention) to thus define a plurality of spaced-apart optical channel waveguide sections 12, 14, 16, 18, 20 and 22 which extend as shown to the end or input plane 24 of the substrate 10. In a preferred embodiment of my invention, these channel waveguide regions 12, 14, 16, 18, 20 and 22 are ion exchanged regions defined in the geometry shown by a process wherein lithium ions are substituted for sodium ions in the glass substrate 10 to form these regions having an approximately semi-elliptical cross-section geometry and extending a chosen predefined distance along the length dimension of the substrate 10.

The optical channel waveguide regions 12, 14, 16, 18, 20 and 22 are integral as shown with a plurality of interconnecting tapered wave transition horn-like sections 26, 28, 30, 32, 34 and 36, and these last-named wave transition sections, as well as the central common wave mixing section 38, are all integral one with another, and also integral with the optical channel waveguide sections. All of these sections are formed simultaneously to a depth of approximately 100 micrometers beneath the upper or first major surface 40 of the substrate 10 using the above-mentioned lithium substitution ion exchange process. During this process, the intermediate partition regions 42, 44, 46, 48, 50, 52 and 54 are appropriately masked using known state of the art photolithographic masking and etching techniques so as to leave these last-named partition regions unaffected by the ion exchange process. The maximum width dimension of the partition regions 42, 44, 46, 48, 50, 52 and 54 is not critical, but the width dimension of the channel waveguide regions, e.g. 12, will preferably be about 65 micrometers, or the width necessary to coincide with the core diameter of the optical fibers used with this device.

Each of the horn-shaped wave transition sections, for example 26, have their remote edges tapered at an angle, $\theta$, with respect to the longitudinal axis (cross-section line 56) of the structure, and $\theta$ will preferably be from between one and four degrees for a waveguide structure with a numerical aperture of 0.2, to achieve optimum optical transmission and high efficiency coupling within the structure. It has been theoretically shown that the taper angle $\theta$ should be less than approximately one-fourth of the maximum guide propagating angle (i.e., the angle at which rays travel with respect to the optical channel direction), to achieve total coupling losses less than that for conventional mixing rod devices.

A thin optical reflecting layer 58, typically silver or gold, is deposited on the other end 60 of the glass substrate 10, using conventional state of the art metal evaporation techniques. Alternatively, the optically reflecting layer 58 may consist of a stack comprising multiple films of a chosen dielectric material, such as $CaF_2$ or $SrF_2$, deposited by evaporation processes known in the art, to a stack thickness of 1 to 2 micrometers. In practice, the reflecting surface may be formed from any number of materials.

One ion exchange process which has been shown to be particularly suitable in fabricating the optical coupler of FIG. 1a is described in a publication by Chartier et al in *Electronic Letters*, Vol. 13, at page 763 (1977). Using the Chartier et al process, the soda glass slide 10 was provided with an aluminum mask in the geometry indicated of between one and two micrometers in thickness and defining the boundaries of the channel waveguide sections, e.g., 12, the horn-shaped tapered waveguide sections, e.g. 26, and also the wave mixing section 38. The masked slide 10 was then suspended for approximately 30 minutes over a eutectic mixture of $Li_2SO_4$ and $K_2SO_4$ and heated in an oxygen atmosphere. Then, the slide 10 was dipped into this eutectic mixture and held there for approximately 20 minutes before a subsequent removal therefrom and then suspension over the mixture for another 10 minutes to minimize thermal shock. Subsequently, the aluminum mask (not shown) was removed by dipping the slide 10 in a hot six molar solution of hydrochloric acid, HCl. By this process, planar waveguides of approximately 100 micrometers thickness were formed by the exchange of lithium ions from the eutectic mixture for the sodium ions in the original soda glass substrate 10. However, other selected lithium and potassium salts, such as LiCl and KCl, may be substituted for the $Li_2SO_4$ and $K_2SO_4$ of the Chartier et al process by those skilled in this processing art. In addition, waveguides having thicknesses in the range of 20 to 200 micrometers may be formed by this process, in accordance with the present invention.

In operation, an optical signal may be coupled from an optical fiber (to be described) into one of the channel waveguides 12 and propagated from the channel waveguide 12 and via the horn-shaped wave transition section 26 into the wave-mixing region 38. This optical signal propagates to the metal reflector 58 from where it is then reflected back into each of the adjacent wave transition sections 26, 28, 30, 32, 34 and 36 and then into the adjacent optical channel waveguide regions 12, 14, 16, 18, 20 and 22. Thus, in this reflective mode of optical data transmission, a single input signal which is applied to the input channel waveguide 12 may be distributed to a plurality of what become, in effect, parallel output channel waveguides 12, 14, 16, 18, 20 and 22. However, as will be described in more detail below in other embodiments of the invention, input optical signals may be applied to all of these channel waveguide sections 12, 14, 16, 18, 20 and 22 and mixed together in the wave mixing section 38, and from there propagated on to other optical signal processing structures. For this latter alternative embodiment of the invention, the reflective means at the other end 60 of the slde 10 may be either totally or partially removed or modified in order to provide a desired measure of control over the mixed signals leaving the wave mixing section 38.

One of the unique novel features of the planar optical coupler according to all embodiments of this invention is that the significant packing fraction losses of the above-described prior art couplers are avoided. By optimum choice of the taper angle $\theta$ of the horn-shaped wave transition sections, the propagation of light through the wave transition sections is optimized both by controlling the expansion of the light from the channel waveguide sections into the mixing section and by efficiently collecting any light reflected back through the mixing section ultimately to the channel waveguide sections. By the unique and novel configuration of the device of the present invention, light enters and leaves the device only through the channel waveguide sections, which are precisely aligned with the cores of the external optical fibers. Thus, losses due to light striking the optical fibers at areas other than the core are avoided. Further, the present invention provides a means for achieving accurate registration between the external optical fibers and the channel waveguide sections by using a substrate with V grooves formed at predetermined locations. In addition, the length of the wave-mixing section of the device of the present invention can be altered to provide optical power outputs of different magnitudes for different output channels, with the outputs being graded.

Furthermore, the present invention also offers the advantage of being capable of being formed by planar processes which are highly reproducible and versatile, can be performed in batch lots, and have relatively high yield and relatively low cost as compared to non-planar processing.

Figure 1B:
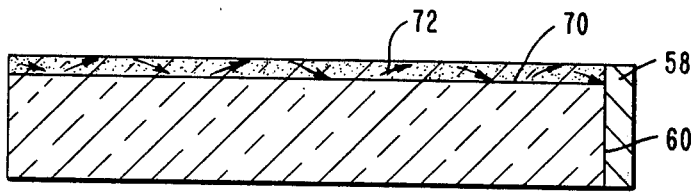

Referring now to FIG. 1b, there is shown a cross-section view taken along lines b—b of FIG. 1a, and this figure illustrates the continuous optical wave propagation across the constant-thickness ion exchanged waveguiding layer, whose 100 micrometer thickness is defined by the interface barrier 70. This interface barrier 70 provides good light propagation containment and reflectivity thereat as indicated by arrows 72, and the ion exchanged region and underlying glass substrate on each side of the interface barrier 70 have substantially different indices of refraction. As is well known in the art, these difference in indices of refraction determine the light reflectivity at the barrier 70, and thus enable all light propagation, reflection and mixing to take place in this thin 20 to 200 micrometer ion exchanged surface layer of the substrate 10. Thus, even though the reflective metal barrier layer 58 is, for convenience sake, deposited over the entire end 60 of the glass slide 10, it is only necessary in the optical coupler in FIGS. 1a and 1b that the reflective barrier 58 be at least vertically coextensive with the thickness of the ion exchanged wave propagating region previously defined.

Figure 2A:
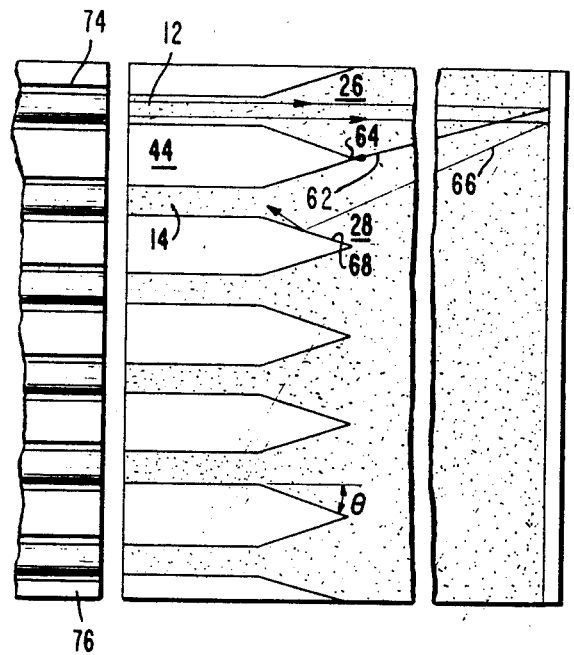
FIG. 2a is a plan view of the upper major surface of the coupler of FIG. 1a in combination with a plurality of optical fiber input data lines adjacent to one end surface of the coupler. This figure illustrates the reflective mode of optical coupling according to the invention.
Figure 2B:
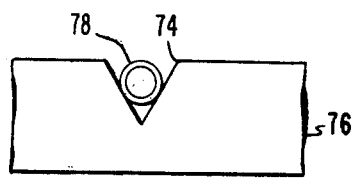
FIG. 2b is an enlarged cross-section view of one optical fiber inpt of FIG. 2a, including the V-groove supporting structure therefor.

Referring now to FIG. 2, the right-hand optical coupling and mixer portion of this structure is identical to the structure of FIG. 1a above and therefore will not be described further herein. However, in FIGS. 2a and 2b there is illustrated one preferred fiber optic input connection for the plurality of channel waveguides, e.g. 12. This fiber optic input connection includes a plurality of V-shaped grooves 74 which are etched in an underlying supportive silicon substrate 76 by appropriately masking the silicon substrate 76 with a suitable etch mask and thereafter exposing the symmetrically spaced unmasked areas of the substrate 76 to a chosen anisotropic etchant, such as hot KOH or ethylenediamine. This etchant will preferentially attack a chosen (100) crystallographic plane of the silicon substrate 76 and will preferentially etch in the vertical direction until a V-shaped groove 74 is attained. Upon completion of these V-shaped grooves 74, optical fibers 78 may then be inserted in these grooves, as indicated in FIG. 2b, and come to rest in precise alignment in the center of the opening of the V-groove 74. Thus, by aligning the openings in the V-groove 74 with the corresponding abutting channel waveguide regions 12, there is no need for any further alignment of the optical fibers 78 which themselves become self-aligned with the channel waveguides 12. This approach has the advantage that the coupling of the optical fibers with the device of the present invention is accomplished en masse, i.e., a plurality of fibers are coupled to the device at one time.

One of the unique novel features of the planar optical coupler according to all embodiments of this invention, and particularly in view of the relatively large coupling losses characteristic of the above-described prior art couplers, is that the only reflection losses of any significance occur, as indicated by path 62, shown in FIG. 2a, when the optical transmission strikes the vertex 64 of a partition, e.g. 44, defining the horn-shaped wave transmission regions, e.g. 26, 28. Thus, most of the reflected optical energy will be propagated along optical paths, such as path 66, and then be reflected from the interior tapered walls 68 defining the horn-like wave transition region 28, and from there propagated into a given optical channel waveguide 14.

Referring now to FIG. 3, there is shown a partially transmissive and partially reflective composite planar optical coupler wherein a pair of identical couplers 80 and 82 are mounted end-to-end as shown, with the respective abutting ends of the couplers 80 and 82 being covered by a partially reflective and partially transmissive metal overlay reflector 84. This reflector 84 may, for example, be vacuum evaporated on the upper surfaces of the abutting end portions of the couplers 80 and 82 using appropriate masking procedures. Alternatively, the partially reflective and partially transmissive surface may be formed by covering the entire 20 to 200 micrometer thickness of two substrates as discussed above with respect to FIG. 1b, and then joining the two structures together at the reflective-transmissive surfaces. The pluralities of channel waveguide sections, e.g. 83, 85 on the left side portion and the right side portion, respectively, of the planar optical coupler are aligned and positioned in intimate abutting contact with the optical fibers, e.g. 86, 87, which are positioned in a corresponding plurality of V grooves, e.g. 88,89, in the underlying supporting substrate, in a manner identical to the construction described above with reference to FIGS. 2a and 2b.

Light enters through a channel waveguide section such as 83, is propagated through the adjoining tapered waveguide section where its reflection is controlled, next passes to the mixing section 81 and then passes to the region beneath the overlay reflector 84. Part of the light is transmitted through this latter-mentioned region and passes through the mixing region 79, is collected by each adjoining tapered waveguide section and is then propagated to each adjoining channel waveguide section, such as 85. Part of the light is reflected by the region beneath the overlay reflector 84 since this overlay causes a change in the index of refraction of the substrate just below the surface of the overlay and the light encountering such a change in refractive index is reflected. This effect is stronger closer to the top surface of the substrate. The reflected light passes through mixing region 81, is collected by each adjoining tapered waveguide section, such as 83 and is then propagated to each adjoining channel waveguide section.

In the alternative configuration in which the partially reflective and partially transmissive surface is formed by covering the entire thickness of the substrate, the device function is similar to that described above except that the light rays are reflected throughout the entire thickness of the waveguide structure, rather than mostly at the surface of the substrate.

Figure 4:
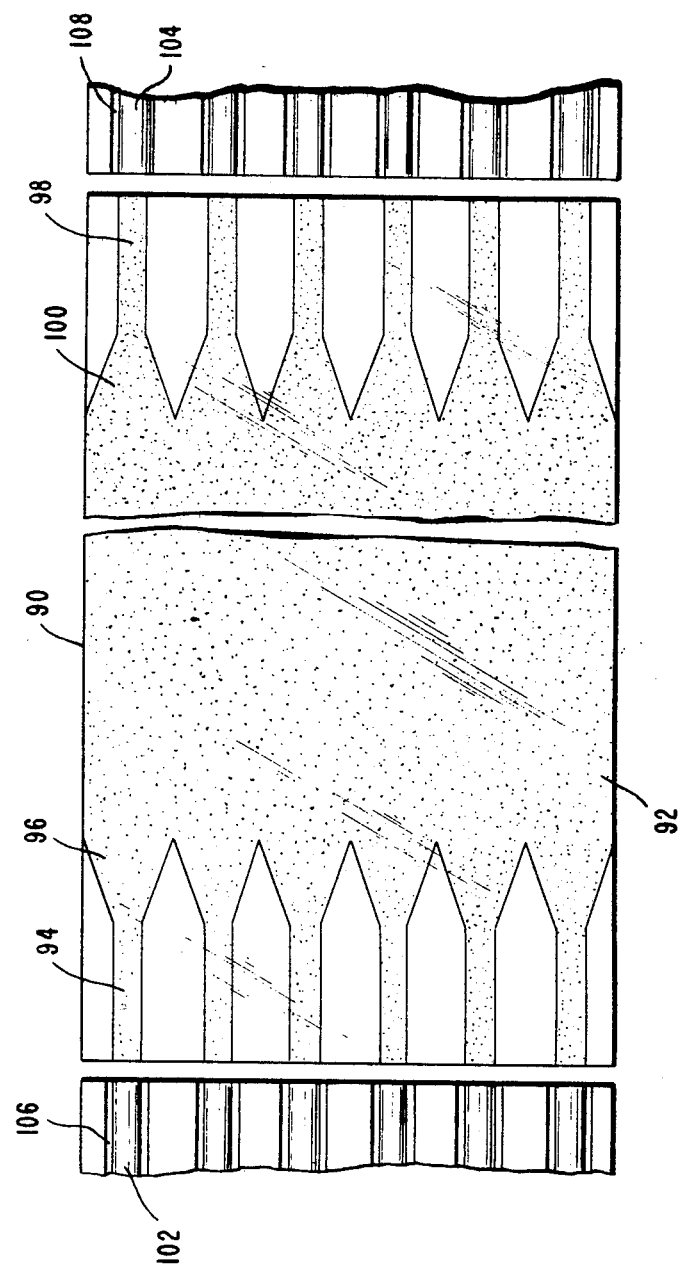
FIG. 4 is a plan view of the completely transmissive planar optical coupler embodiment of the invention, also including a plurality of input and output data transmission optical fibers therefor.

Referring now to FIG. 4, there is shown a completely transmissive planar coupler 90, including a common central wave-mixing region 92 which is formed, for example, by the same ion exchange process described above with reference to FIG. 1a. The wave-mixing region 92 is integral and coextensive in thickness with the input channel waveguide and wave transition regions, e.g. 94, 96 in the left hand portion of the coupler and also integral and coextensive in thickness with the output channel waveguide and wave transition sections, e.g. 98, 100, on the right side portion of the coupler. The pluralities of input and output channel waveguide sections, e.g. 94, 98, on each side of the planar optical coupler are aligned and positioned in intimate abutting contact with the optical fibers, e.g. 102, 104, which are positioned in a corresponding plurality of V grooves, e.g. 106,108 in the underlying supporting substrate in a manner identical to the construction described above with reference to FIGS. 2a and 2b.

Light enters through a channel waveguide section such as 94, is propagated through the adjoining tapered waveguide section, such as 96, where its expansion is controlled, and next passes to the mixing section 92. Then the light passes through the mixing section 92, is collected by each adjoining tapered waveguide section, such as 100, and is then propagated to each adjoining channel waveguide section, such as 98.

Various modifications may be made to the above-described embodiments without departing from the true scope of my invention. For example, the optical couplers described above are not limited to wave propagation regions created by the ion exchange process and may instead be created by other processes such as, for example, the proton implantation process described by E. Garmire et al in a publication entitled "Optical Waveguiding in Proton Implanted Gallium Arsenide" *APPLIED PHYSICS LETTERS*, Vol. 21, No. 3, Aug. 1, 1972, pp. 87–88. Obviously, such alternative processes may include substrates or slides of various other optical and semiconductor materials instead of glass.

EXAMPLE

This example illustrates the formation and performance of a device similar to the device described above with respect to FIG. 4, except that in the present device, the left and right sides thereof each have 8 ports.

A glass slide containing 10 to 16% Na, 2 millimeters (mm) thick, 2 centimeters wide, and 12 centimeters long obtained from Corning Glass Works of Corning, New York, was provided with an aluminum mask and subjected to ion exchange as described herein with regard to FIG. 1a. The horn-like tapered waveguide sections were formed with a taper angle of 1 degree.

Using the above-described device, an optical signal obtained from a GaAlAs laser with information modulation was applied to an optical fiber which abutted one input port of the device. The outputs from the 8 output ports of the device were measured and it was determined that there was a total insertion loss of −9 decibels (db). It was further determined that coupling losses caused by imperfect matching of the optical fiber fields with the channel waveguide field, accounted for 4.4 db of the total loss. Thus, the internal loss was calculated to be −(9.0-4.4) db or −4.6 db. Included in this internal loss are propagation losses due to absorption, scattering, and waveguide imperfections. For a 12 cm waveguide and assuming a loss of 0.1 db/cm, the internal loss due to absorption, scattering, and imperfections is calculated to be 1.2 db. The net internal loss is thus −(4.6-1.2) db or −3.4 db. This value is to be compared to that of the prior art device previously discussed, which had a loss of 42 percent or −3.8 db. The improved performance of this embodiment of the present invention over that of the prior art device merely demonstrates the theory of the present invention. By optimizing the design of the devices of the present invention, devices with even greater transmission efficiency can be achieved. Theoretical results indicate that for a taper angle of 1 degree used in a waveguide structure with a numerical aperature of 0.2, an optimized device would exhibit a loss of 1 db or 20 percent.

While the invention has been particularly described with respect to the preferred embodiments thereof, it will be recognized by those skilled in the art that certain other modifications in form and detail may be made without departing from the spirit and scope of the invention. In particular, the scope of this invention is not limited to the configurations of input and output ports described herein, but includes asymmetric configurations with uneven numbers of ports on each half of the device and includes other numbers of input and output ports. Further, while the present invention has been described mainly with respect to inputs to a single channel waveguide, it is to be understood that inputs may be made to multiple channel waveguides simultaneously. In addition, the horn-shaped tapered waveguide structure need not be linearly expanding as shown herein, but may be an exponential or parabolic horn structure. Further, the substrate is not limited to a glass slide as previously noted, but may include suitable substrates of other materials or other configurations, such as a rod.

What is claimed is:
1. An optical coupler comprising:
 (a) a substrate of a chosen optical material having first and second major surfaces between which extend an input plane and an output reflective or transmissive plane;
 (b) a plurality of spaced-apart optical channel waveguide sections adjacent said first major surface and each extending to said input plane;
 (c) a plurality of tapered wave transition sections extending integral from said channel waveguide sections, respectively, and joined with each adjacent wave transition section at a common vertex in a multiple, side-by-side horn-like configuration;
 (d) a wave mixing section integral at one end thereof with all of said wave transition sections and vertically coextensive therewith and extending to or near said output plane; and
 (e) mear, adjacent said output plane for transmitting or reflecting light which is propagated thereto from said wave mixing section, whereby the tapered geometry of said wave transition sections enhances the optical coupling efficiency between said plurality of channel waveguide sections and said wave mixing section.

2. The optical coupler defined in claim 1 wherein said substrate is a glass containing sodium ions and all of said optical wave propagation regions therein are created by substituting lithium ions for sodium ions in said glass substrate.

3. The optical coupler defined in claims 1 or 2 wherein each of said channel waveguide sections are abutted to a separate optical fiber and receive light therefrom.

4. The optical coupler defined in claim 3 wherein each optical fiber is mounted in a different selectively spaced V-shaped groove in an underlying supporting substrate and there aligned respectively with each abutting channel waveguide.

5. The optical coupler defined in any one of claims 1, 2, 3 or 4 above wherein said transmitting or reflecting means includes a thin layer of metal extending across said output plane of said substrate for reflecting light received from one of said channel waveguides into one or more of the adjacent channel waveguides.

6. The optical coupler defined in any one of claims 1, 2, 3 or 4 above wherein said transmitting or reflecting means includes a thin strip of reflector metalization of predetermined width overlying said output plane, and an additional, second optical coupler identical with the first recited optical coupler and having its own output plane abutting said output plane of the first-named optical coupler, with both output planes of said abutting couplers underlying said thin strip of reflector metalization.

7. The optical coupler defined in any one of claims 1, 2, 3 or 4 above wherein said reflecting or transmitting means includes a second optical coupler identical to the first-named optical coupler and having a wave mixing region thereof integral and vertically coextensive with said wave mixing region of the first-named optical coupler, said optical couplers including, respectively, a plurality of input and output optical fibers aligned, respectively, with pluralities of input and output channel waveguide sections of each optical coupler for coupling optical data from one plurality of optical fibers to another.

8. An optical coupling structure which comprises:
 (a) a substrate having first and second major surfaces between which extend first and second minor end surfaces or planes, with said minor end surfaces or planes adapted to receive or reflect light;
 (b) a plurality of spaced-apart optical channel waveguide sections adjacent said first major surface and each extending to said first minor end surface or plane;
 (c) a plurality of tapered wave transition sections having a predetermined taper angle, extending integrally from said optical waveguide sections, respectively, and being joined with adjacent wave transition sections in a multiple side-by-side horn-like configuration;
 (d) a wave-mixing section integral at one end thereof with all of said wave-transition sections and also adjacent said one major surface, said wave-mixing section having another end thereof extending to or near said second minor end surface or plane of said substrate;
 (e) means at said second minor end surface or plane of said substrate for transmitting or reflecting light which is propagated thereto from said wave-mixing section;

(f) a plurality of optical fibers abutting said first or said first and second minor end surfaces and aligned with said channel waveguide sections; and (g) means for accurately registering said optical fibers to said channel waveguide sections.

9. An optical coupling structure as set forth in claim 8 wherein said means for accurately registering said optical fibers comprises a silicon wafer having V-shaped grooves etched therein at predetermined locations whereby said V-shaped grooves hold said optical fibers in registered position relative to the portions of said plurality of channel waveguide sections which are adjacent to said first minor end surface or said first and second minor end surfaces.

10. An optical coupler device for parallel data distribution comprising:
   (a) a glass substrate having formed therein and to a depth of between 20 and 200 micrometers below the top surface of said substrate an optical waveguiding structure which comprises:
      (i) a plurality of parallel-walled, spaced-apart channel waveguide sections adjacent said top surface of said substrate and extending laterally to a first minor surface or plane of said substrate which is perpendicular to said top surface of said substrate;
      (ii) a plurality of horn-shaped tapered waveguide sections having a predetermined taper angle, each of which tapered waveguide sections extends integrally from one of said channel waveguide sections and joined to adjacent tapered waveguide sections at a common vertex;
      (iii) a wave-mixing section integral with said plurality of horn-shaped, tapered waveguide sections and extending to or near a second minor surface or plane of said substrate which is perpendicular to said top surface of said substrate; and
   (b) means at said second surface or plane of said substrate for transmitting or reflecting light propagated thereto from said mixing section, whereby light propagated by said channel waveguide sections strikes said tapered waveguide sections and is reflected in a manner which controls the angular expansion and collection of said light into and out of said mixing region to provide efficient transfer of light by said coupler device.

11. An optical coupler as set forth in claim 10 wherein said predetermined taper angle is less than one half of the maximum waveguide propagation angle.

12. An optical coupler device for parallel data distribution comprising:
   (a) a glass substrate having formed therein and to a depth of between 20 and 200 micrometers below the top surface of said substrate an optical waveguiding structure which comprises:
      (i) a plurality of parallel-walled, spaced-apart channel waveguide sections adjacent said top surface of said substrate and extending laterally to a first minor surface or plane of said substrate which is perpendicular to said top surface of said substrate;
      (ii) a plurality of horn-shaped tapered waveguide sections having a predetermined taper angle, each of which tapered waveguide sections extends integrally from one of said channel waveguide sections and joined to adjacent tapered waveguide sections at a common vertex;
      (iii) a wave-mixing section integral with said plurality of horn-shaped, tapered waveguide sections and extending to or near a second minor surface or plane of said substrate which is perpendicular to said top surface of said substrate; and
   (b) means at said second minor surface of said substrate for highly reflecting light propagated thereto from said mixing section, back through said mixing section to said plurality of tapered waveguide sections and thence to said plurality of channel waveguide sections and to the portions of said plurality of channel waveguide sections which are adjacent said first minor surface of said substrate, whereby said tapered waveguide sections control the angular expansion and collection of light propagated therethrough, to provide efficient transfer of said light by said device.

13. An optical coupler device for parallel data distribution comprising a glass substrate having formed therein and to a depth of between 20 and 200 micrometers below the top surface of said substrate:
   (a) a first optical waveguiding structure which comprises:
      (i) a plurality of parallel-walled, spaced-apart channel waveguide sections adjacent said top surface of said substrate and extending laterally to a minor surface or plane of said substrate which is perpendicular to said top surface of said substrate;
      (ii) a plurality of horn-shaped, tapered waveguide sections having a predetermined taper angle, each of which tapered waveguide sections extends integrally from one of said channel waveguide sections and joined to adjacent tapered waveguide sections at a common vertex;
      (iii) a wave-mixing section integral with said plurality of horn-shaped, tapered waveguide sections and extending to or near a central plane of said substrate which is perpendicular to said top surface of said substrate; and
   (b) a second optical waveguide structure which is the mirror image of said first optical waveguide structure, with said first and said second waveguide structures being contiguous at said mixing sections, whereby light is propagated through said first and said second waveguide structures and ultimately to said plurality of channel waveguide sections in said second waveguide structure in a manner which controls the angular expansion and collection of said light to provide efficient transfer of said light by said coupler device.

14. An optical coupler device for parallel data distribution comprising a glass substrate having formed therein and to a depth of between 20 and 200 micrometers below the top surface of said substrate:
   (a) a first optical waveguiding structure which comprises:
      (i) a plurality of parallel-walled, spaced-apart channel waveguide sections adjacent said top surface of said substrate and extending laterally to a minor surface or plane of said substrate which is perpendicular to said top surface of said substrate;
      (ii) a plurality of horn-shaped, tapered waveguide sections having a predetermined taper angle, each of which tapered waveguide sections extends integrally from one of said channel waveguide sections and joined to adjacent tapered waveguide sections at a common vertex;

(iii) a wave-mixing section integral with said plurality of horn-shaped, tapered waveguide sections and extending to or near a central plane of said substrate which is perpendicular to said top surface of said substrate;

(b) a second optical waveguide structure which is the mirror image of said first optical waveguide structure, with said first and said second waveguide structures being contiguous at said mixing sections, whereby light is propagated through said first and said second waveguide structures and ultimately to said plurality of channel waveguide sections in said second waveguide structure; and (c) means at or on said central plane of said substrate for partially reflecting light propagated thereto from said mixing section of said first optical waveguide structure, back through said mixing section to said plurality of tapered waveguide sections of said first optical waveguide structure and thence to said plurality of channel waveguide sections of said first optical waveguide structure which are adjacent said minor surface of said substrate, whereby said tapered waveguide sections in said first and said second waveguide structures control the angular expansion and collection of light propagated therethrough to provide efficient transfer of said light by said device.

15. A device as set forth in claims 12 or 14 wherein said means for reflecting light comprises a film of predetermined thickness of a material selected from the group consisting of a chosen metal and a chosen dielectric material.

* * * * *